(12) United States Patent  
Narasimhan et al.

(10) Patent No.: US 9,554,185 B2  
(45) Date of Patent: Jan. 24, 2017

(54) SUPPORTING MULTIPLE ATTENTION-BASED, USER-INTERACTION MODES

(75) Inventors: Nitya Narasimhan, Hopewell Junction, NY (US); Silviu Chiricescu, Chicago, IL (US); Venugopal Vasudevan, Palatine, IL (US); Joseph F. Wodka, Hoffman Estates, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 735 days.

(21) Appl. No.: 13/326,574

(22) Filed: Dec. 15, 2011

(65) Prior Publication Data

US 2013/0159876 A1    Jun. 20, 2013

(51) Int. Cl.
| | |
|---|---|
| *G06F 3/048* | (2013.01) |
| *H04N 21/442* | (2011.01) |
| *H04N 21/6543* | (2011.01) |
| *H04N 21/6547* | (2011.01) |

(52) U.S. Cl.
CPC .... *H04N 21/44218* (2013.01); *H04N 21/6543* (2013.01); *H04N 21/6547* (2013.01)

(58) Field of Classification Search
CPC .................. H04N 21/44218; H04N 21/44029
See application file for complete search history.

(56) References Cited

U.S. PATENT DOCUMENTS

| | | | |
|---|---|---|---|
| 6,889,382 | B1 | 5/2005 | Anderson |
| 7,022,075 | B2 | 4/2006 | Grunwald et al. |
| 7,284,201 | B2 | 10/2007 | Cohen-Solal |
| 7,289,606 | B2 | 10/2007 | Sibal et al. |
| 7,365,651 | B2 | 4/2008 | Massey et al. |
| 7,460,940 | B2 | 12/2008 | Larsson et al. |

(Continued)

FOREIGN PATENT DOCUMENTS

| | | |
|---|---|---|
| EP | 2282543 A2 | 2/2011 |
| JP | 09/244781 | 9/1997 |

(Continued)

OTHER PUBLICATIONS

Patent Cooperation Treaty, International Search Report and Written Opinion of the International Searching Authority for International Application No. PCT/US2012/065410, Feb. 11, 2013, 15 pages.

(Continued)

*Primary Examiner* — William Trapanese  
(74) *Attorney, Agent, or Firm* — Stewart M. Wiener (57) ABSTRACT

The present invention monitors a user's activities to determine how much attention he is paying to one or more devices. Based on the information gathered about the user's current "attention profile," a "user-interaction parameter" is set that reflects where the user's attention is focused and, ideally, how much of his attention is given to each device. Then, based on the user-interaction parameter, the user interface of at least one of the user's devices is configured to optimize the user's interactions, given the amount of attention he is currently giving to this user interface. If the user is giving the majority of his attention to the television, for example, then the user interface of a companion device can be configured to emphasize the types of interactions available to a user who is not actively watching the companion device.

18 Claims, 7 Drawing Sheets

(56) References Cited

U.S. PATENT DOCUMENTS

| | | | |
|---|---|---|---|
| 7,822,783 | B2 | 10/2010 | Carrabis |
| 7,882,145 | B2 | 2/2011 | Shenfield |
| 7,890,849 | B2 | 2/2011 | Moraveji et al. |
| 7,908,172 | B2 | 3/2011 | Corts et al. |
| 8,060,904 | B1 | 11/2011 | Evans et al. |
| 8,484,676 | B1 | 7/2013 | Narsimhan et al. |
| 8,763,042 | B2 | 6/2014 | Ishtiaq et al. |
| 2002/0026359 | A1 | 2/2002 | Long et al. |
| 2002/0144259 | A1 | 10/2002 | Gutta et al. |
| 2003/0014491 | A1 | 1/2003 | Horvitz et al. |
| 2003/0018969 | A1 | 1/2003 | Humpleman et al. |
| 2003/0097659 | A1 | 5/2003 | Goldman |
| 2003/0135539 | A1 | 7/2003 | Kondo et al. |
| 2004/0158859 | A1 | 8/2004 | Aoyama et al. |
| 2005/0060745 | A1 | 3/2005 | Riedl et al. |
| 2005/0099492 | A1 | 5/2005 | Orr |
| 2006/0192775 | A1* | 8/2006 | Nicholson et al. ........... 345/211 |
| 2006/0265651 | A1 | 11/2006 | Buck |
| 2007/0021065 | A1 | 1/2007 | Sengupta et al. |
| 2007/0094083 | A1 | 4/2007 | Yruski et al. |
| 2007/0260521 | A1 | 11/2007 | Van Der Riet |
| 2008/0034085 | A1 | 2/2008 | Chawla et al. |
| 2008/0127246 | A1 | 5/2008 | Sylvain |
| 2008/0235752 | A1 | 9/2008 | Tecot et al. |
| 2008/0243610 | A1 | 10/2008 | Ragno et al. |
| 2008/0276270 | A1 | 11/2008 | Kotaru et al. |
| 2008/0307351 | A1 | 12/2008 | Louch et al. |
| 2009/0132276 | A1 | 5/2009 | Petera |
| 2009/0132339 | A1 | 5/2009 | Sloo et al. |
| 2009/0320073 | A1* | 12/2009 | Reisman ........................ 725/51 |
| 2010/0013997 | A1 | 1/2010 | Hwang |
| 2010/0046606 | A1 | 2/2010 | Celik et al. |
| 2010/0095317 | A1 | 4/2010 | Toebes et al. |
| 2010/0299187 | A1 | 11/2010 | Duggal |
| 2011/0016498 | A1 | 1/2011 | Tsuria et al. |
| 2011/0072370 | A1 | 3/2011 | Mitchell et al. |
| 2011/0106744 | A1 | 5/2011 | Becker et al. |
| 2011/0154499 | A1 | 6/2011 | Rohan et al. |
| 2011/0270653 | A1 | 11/2011 | Gupta et al. |
| 2012/0096486 | A1 | 4/2012 | Stallard et al. |
| 2012/0102233 | A1 | 4/2012 | Shah et al. |
| 2013/0144709 | A1 | 6/2013 | Narasimhan et al. |
| 2013/0160036 | A1 | 6/2013 | Narasimhan et al. |
| 2014/0143043 | A1 | 5/2014 | Wickramasuriya et al. |
| 2014/0143803 | A1 | 5/2014 | Narsimhan et al. |

FOREIGN PATENT DOCUMENTS

| | | |
|---|---|---|
| JP | 2002-0084232 | 11/2002 |
| JP | 2005013713 A | 1/2005 |
| WO | 2011032777 A1 | 3/2011 |

OTHER PUBLICATIONS

Patent Cooperation Treaty, International Search Report and Written Opinion of the International Searching Authority for International Application No. PCT/US2012/064907, Feb. 11, 2013, 14 pages.

A. Carr, "With AmEx Partnership, Foursquare May Prove Social Media's Real ROI," accessed at http://www.fastcompany.com/1762726/amex-partnership-foursquare-may-prove-social-medias-real-roi, accessed on May 2, 2013.

A. Klaassen, "Podbridge Aims to put Fresh Ads in Time-shifted Content", Ad Age Digital, Ad & Marketing News, published Aug. 1, 2006, accessed at http://adage.com/article/digital/podbridge-aims-put-fresh-ads-time-shifted-content/110835/ (3 pages).

A. Chianese, et al., "Scene Detection using Visual and Audio Attention", Ambi-sys '08, ACM (7 pages) (Feb. 2008).

B. Carter, "TiVo to Buy Company That Tracks Shopping of TV Viewers," New York Times, Jul. 16, 2012.

B. Schauerte, et al., "Multimodal Saliency-based Attention for Object-based Scene Analysis", International Conference on Intelligent Robots and Systems (IROS), IEEE/RSJ, pp. 1173-1179 (Sep. 2011).

G. Evangelopoulos, et al., "Video Event Detection and Summarization Using Audio, Visual and Text Saliency", IEEE International Conference on Acoustics, Speech and Signal Processing, pp. 3553-3556 (Apr. 2009).

J. Taylor, "Bringing Analytics into Processes Using Business Rules", BPMInstitute.org, available at http://www.bpminstitute.org/resources/articles/bringing-analytics-processes-using-business-rules, Monday, Apr. 10, 2006 (3 pages).

M. Mancas, et al., "Human Attention Modelization and Data Reduction," Video Compression. ISBN: 978-953-51-0422-3. InTech, pp. 103-128 (Mar. 2012).

Mediamind, "O2 Dual Screen Case Study for Million Pound Drop," available at http://www.mediamind.com/resource/o2-dual-screen-case-study-million-pound-drop, accessed Nov. 2012 (5 pages).

P. Baldi, et al., "Of bits and wows: A Bayesian theory of surprise with applications to attention," Neural Networks, vol. 23, No. 5, pp. 649-666 (2010).

Q. Chen, et al., "Operational BI platform for video analytics," Proceedings of the International Conference on Management of Emergent Digital EcoSystems, pp. 180-187, ACM, New York, NY 2009 (abstract).

S. Kavaldjian, et al., "Generating content presentation according to purpose," IEEE International Conference on Systems, Man and Cybernetics, pp. 2046-2051, Oct. 2009 (abstract).

Secondscreen Networks, "The Ad Platform for the Second Screen," available at http://www.secondscreen.com/how-it-works, accessed Nov. 15, 2012 (3 pages).

Yahoo! Finance, "DG Announces Pioneering Dual-Screen Video Ad Platform," press release, Apr. 2012, available at http://finance.yahoo.com/news/dg-announces-pioneering-dual-screen-161500829.html (2 pages).

Y.F. Ma, et al., "A User Attention Model for Video Summarization," ACM Multimedia (10 pages), Dec. 2002.

Official Action RE: Canadian Application No. 2,859,540, dated Oct. 20, 2015.

Official Action, RE: Korean Application No. 10-2014-7019142; dated Aug. 27, 2015.

EPC Examination Report, RE: Application No. 12795959.1, dated Dec. 3, 2015.

Office Action for U.S. Appl. No. 13/326,469, mailed on Mar. 7, 2013.

Office Action for U.S. Appl. No. 13/326,469, mailed on Oct. 17, 2013.

Office Action for U.S. Appl. No. 13/326,469, mailed on Sep. 5, 2013.

Office Action for U.S. Appl. No. 13/326,469, mailed on Mar. 23, 2015.

* cited by examiner

SUPPORTING MULTIPLE ATTENTION-BASED, USER-INTERACTION MODES

CROSS-REFERENCE TO RELATED APPLICATION

The present application is related to U.S. Patent Application PCT/US2012/064907, filed on an even date herewith.

FIELD OF THE INVENTION

The present invention is related generally to computer communications and, more particularly, to interactive television.

BACKGROUND OF THE INVENTION

As personal communications devices (e.g., cell phones) are developed to support greater and greater functionality, people are using them to do much more than talk. As is well known, these devices now usually allow their users to create media files (e.g., by taking a picture or by recording a video using a camera on the device), to download media files from remote servers (via a web interface supported by the device), and to access interactive applications.

However, even as people spend more time online, traditional media remain very important. Indeed, rather than simply replacing traditional media time with online time, many people are beginning to "multi-task," that is, to combine traditional and new media. For example, while they watch television, their personal communications device becomes a "companion device" displaying content often, but not always, related to the content shown on their television. Similarly, while they are engaged in an interactive application on their companion device, they remain at least peripherally aware of the content that the television is displaying.

Televisions and companion devices are not designed to optimize the same type of user interactions. Terminology reflects this distinction: Television programming is aimed at "viewers," while companion devices invite "users." That is, television programming is designed, for the most part, to be passively watched while the viewer "leans back" on his couch. Companion devices, supporting fully interactive applications, invite users who "lean forward" to more actively interact with the applications.

BRIEF SUMMARY

The above considerations, and others, are addressed by the present invention, which can be understood by referring to the specification, drawings, and claims. The present invention monitors a user's activities to determine how much attention he is paying to one or more devices (e.g., a television and a companion device such as a smart phone, tablet computer, or game console). Based on the information gathered about the user's current "attention profile," a "user-interaction parameter" is set that reflects where the user's attention is focused and, ideally, how much of his attention is given to each device. Then, based on the user-interaction parameter, the user interface of at least one of the user's devices is configured to optimize the user's interactions, given the amount of attention he is currently giving to this user interface.

Many types of information may be used in setting the user-interaction parameter including an explicit setting by the user, a history of the user's interactions with various devices, and the user's recent interactions with the devices.

If the user is giving the majority of his attention to the television, for example, then the user interface of the companion device can be configured to emphasize the types of interactions available to a user who is not actively watching the companion device. That is, a touch or motion sensor could be emphasized over a keypad for user input. The screen presentation could be made less rich with fewer, but potentially brighter, icons to catch the user's eye if appropriate.

When, in contrast, the user's attention is mostly given to the companion device, that device's user interface could be configured to emphasize richer and more precise inputs and outputs such as a keyboard and a screen display presenting more detailed information.

When a user device receives media content (e.g., an advertisement or e-mail), the device's display of that content depends upon the user-interaction parameter. The device can even select content to display (or an application to run) based on the user's current attention profile.

Several device types are contemplated that embody aspects of the present invention. Some user devices are sophisticated enough to gather attention-profile information, set the user-interaction parameter, and then respond to the setting appropriately. Other devices may not be able to set the user-interaction parameter but can respond appropriately if another device sends it the parameter. If a remote server is told the parameter (and possibly other related information), it can respond by sending appropriate content (or a command) to the user's devices. Another type of remote server can gather attention-profile information from the user's devices and determine the user-interaction parameter itself. Devices of all of these types, and others, can work together to enhance the usefulness of the present invention.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

Figure 1:
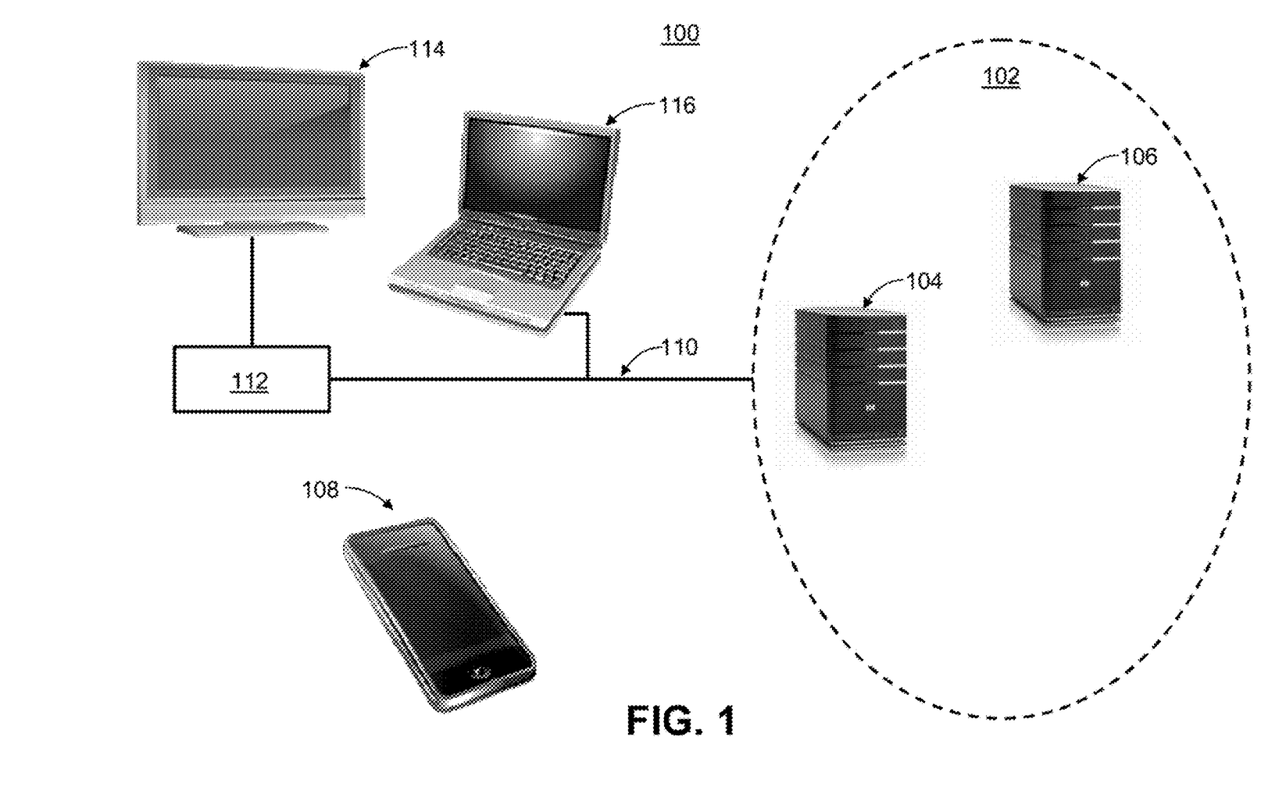
FIG. 1 is an overview of a representational environment in which the present invention may be practiced.

Aspects of the present invention may be practiced in the representative communications environment 100 of FIG. 1. Connected together via any or all of various known networking technologies 102 are servers 104, 106. Some of these servers 104, 106 may head-end a cable-television delivery system 110. Others may be web servers. For ease of illustration, only two servers 104, 106 are shown, but numerous servers 104, 106 can exist and can work together, as discussed below.

Head-end servers provide, via the networking technologies 102, media-download and television services to end-user devices. One example of an end-user device is a cellular telephone 108. This telephone 108 communicates wirelessly to a wireless base station (not shown but known in the art) to access the public switched telephone network, the Internet, or other networks to access the services provided by the head-end server and by web servers.

Non-wireless end-user devices are supported by "wireline" network technologies (e.g., fiber, wire, and cable) 110. For example, a set-top box 112 generally receives television programming from a head-end server and provides a user interface (e.g., an interactive program guide) for selecting and viewing content from the head-end server. A digital video recorder (not shown) can store programming for later viewing. Video content may be viewed on a television monitor 114. In some situations, a laptop computer 116 accesses web-based services either wirelessly or via the wireline network 110. A home gateway, kiosk, digital sign, or media-restreaming device (not shown) are other possible end-user devices.

(A media-restreaming device transfers content between disparate types of networks. For example, it receives content from a cable system 110 and then transmits that content over a local radio link such as WiFi to the cellular telephone 108. The media-restreaming device usually operates in both directions to carry messages between the networks. In some embodiments, aspects of the present invention are practiced by a media-restreaming device.)

A user may split his attention by interacting with any or all of the end-user devices 108, 112, 114, 116 at roughly the same time or in a temporally overlapping manner. Examples in the present discussion usually assume that the user is watching the television monitor 114 and possibly interacting with it through the set-top box 112. At least occasionally, some of the user's attention is also given to the smart phone 108.

Figure 3A:
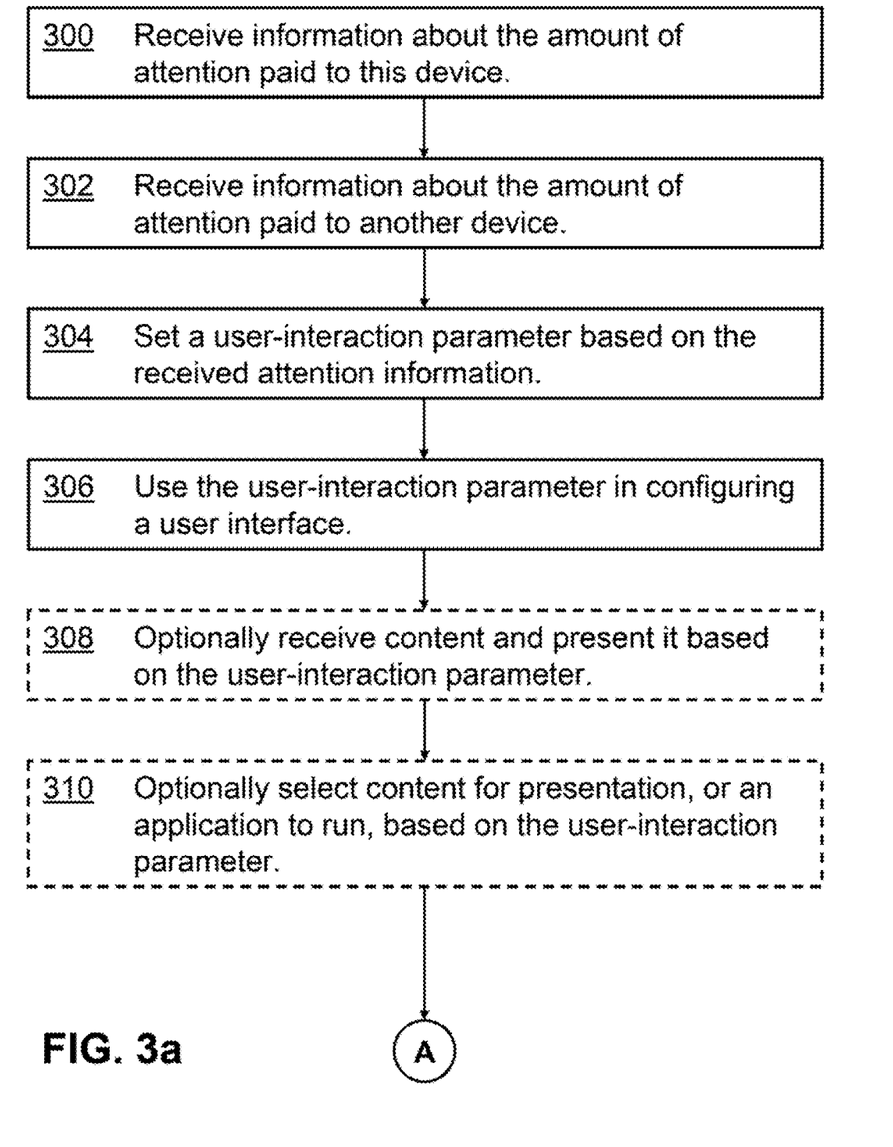
FIGS. 3a and 3b together form a flowchart of a representative method for an end-user device that sets the user-interaction parameter.
Figure 3B:
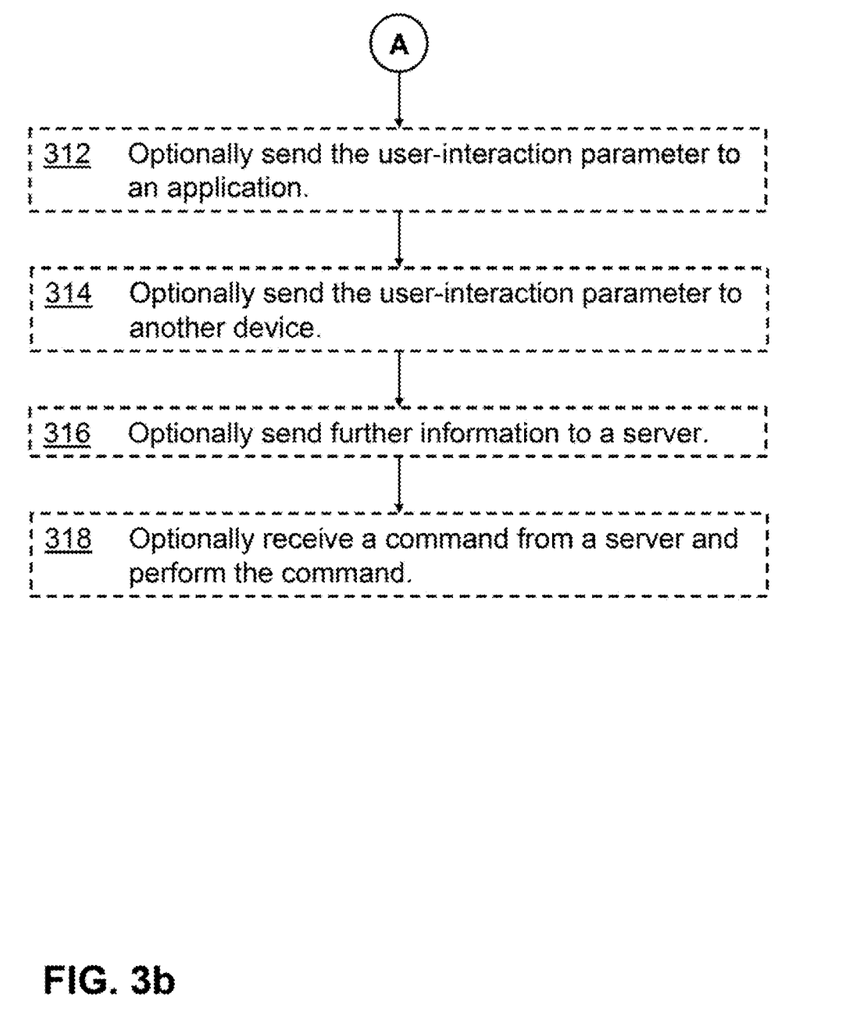

Some of the end-user devices are sophisticated enough to gather information about the user's attention-profile, set an user-interaction parameter that represents that profile, and then respond to the setting appropriately. For purposes of the present discussion, these devices are called "Class A" devices, and, in a purely arbitrary assignment, the smart phone 108 is taken as representative of this class. (The flowchart of FIG. 3 and the accompanying discussion illustrate the workings of a Class A device.)

Other end-user devices may not be able to set the user-interaction parameter but can respond appropriately if another device sends it the parameter. Again for purposes of the present discussion, these are called "Class B" devices, and the set-top box 112 is used to represent this class (illustrated by FIG. 4). Yet other end-user devices can neither set the user-interaction parameter nor respond to it. Still, these prior art "Class C" devices are important in the communications environment 100 because they can take up some of the user's attention. The television monitor 114 is here portrayed as a Class C device.

Figure 5:
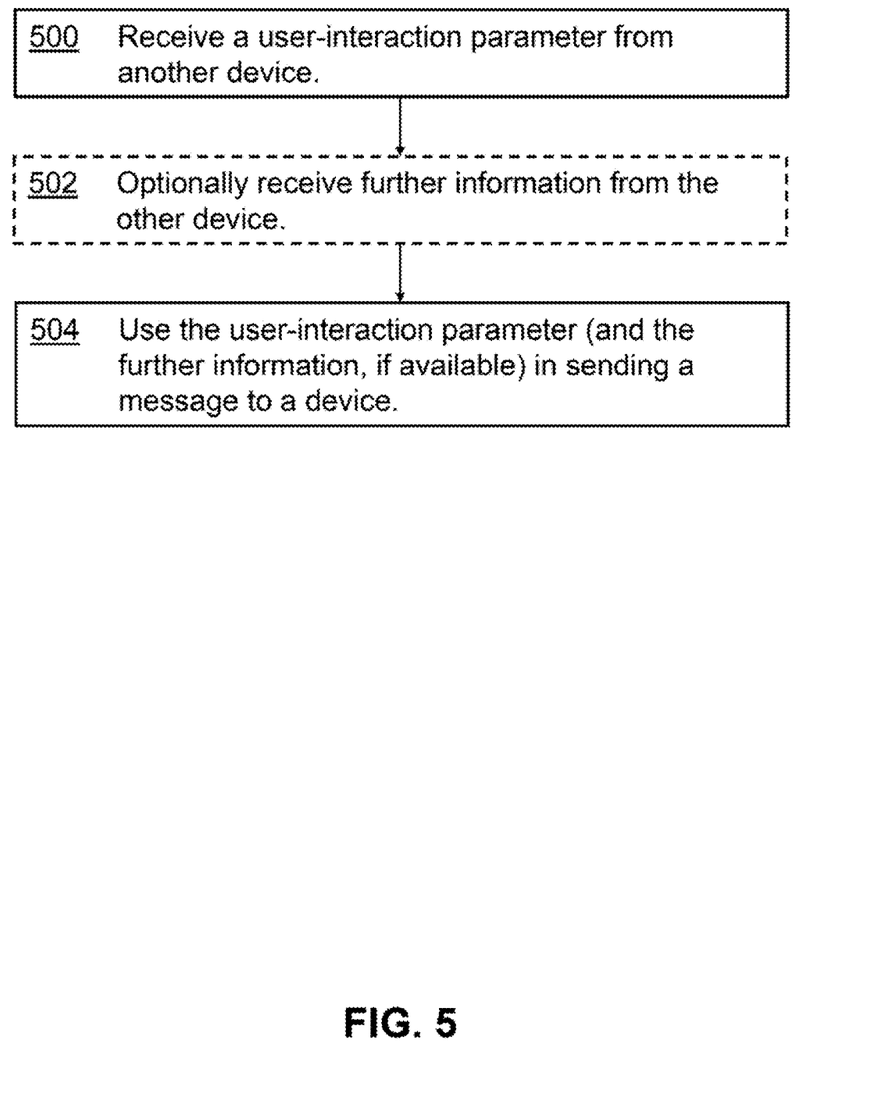
FIG. 5 is a flowchart of a representative method for a server that responds to a user-interaction parameter sent to it.
Figure 6:
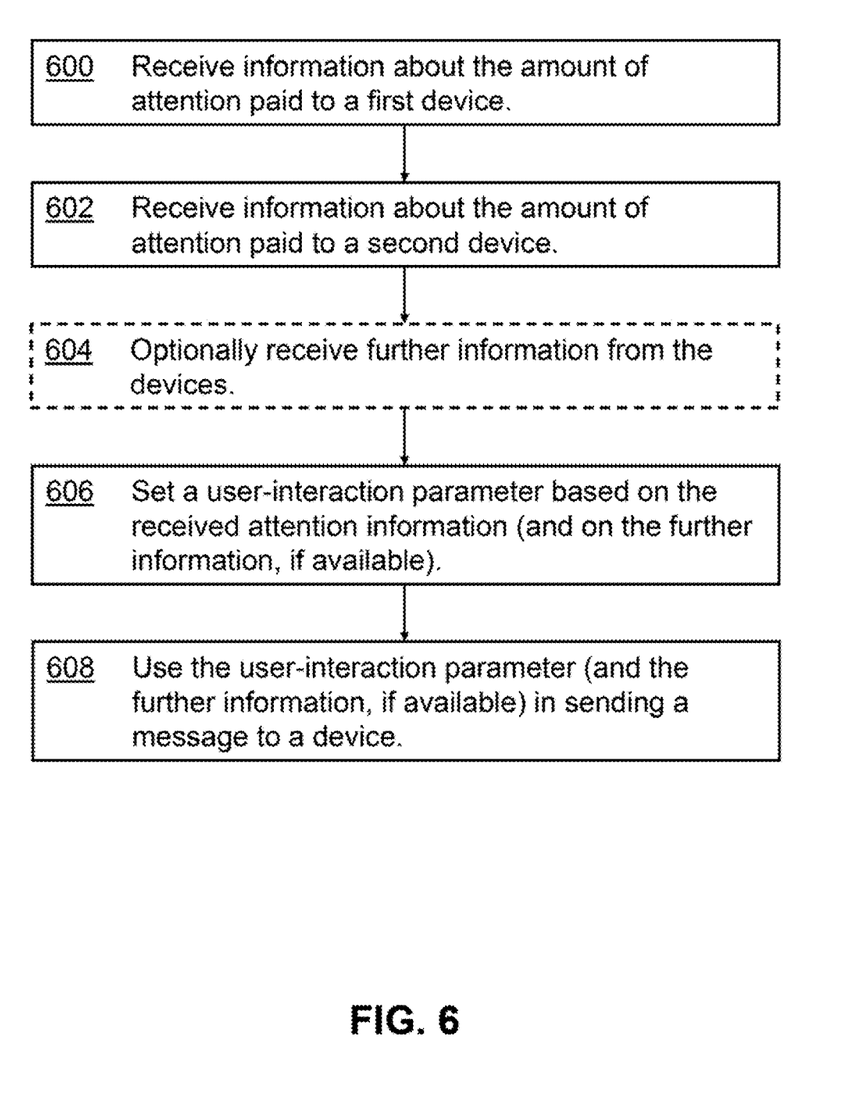
FIG. 6 is a flowchart of a representative method for a server that sets the user-interaction parameter.

"Class Y" servers, if told the user-interaction parameter (and possibly other related information), can respond by sending appropriate content (or a command) to the user's devices. (Server 104 represents Class Y which is illustrated by FIG. 5.) A server that can gather attention-profile information from the end-user devices 108, 112, 114, 116 and determine the user-interaction parameter itself is a "Class Z" device and is illustrated by FIG. 6.

Note that the distinctions between classes of devices, while useful for illustrating aspects of the present invention, are not so clear cut in the real world. A device may operate in one class in some situation and in other class in other situations.

Devices of all of these types, and others, can work together to enhance the usefulness of the present invention.

Figure 2:
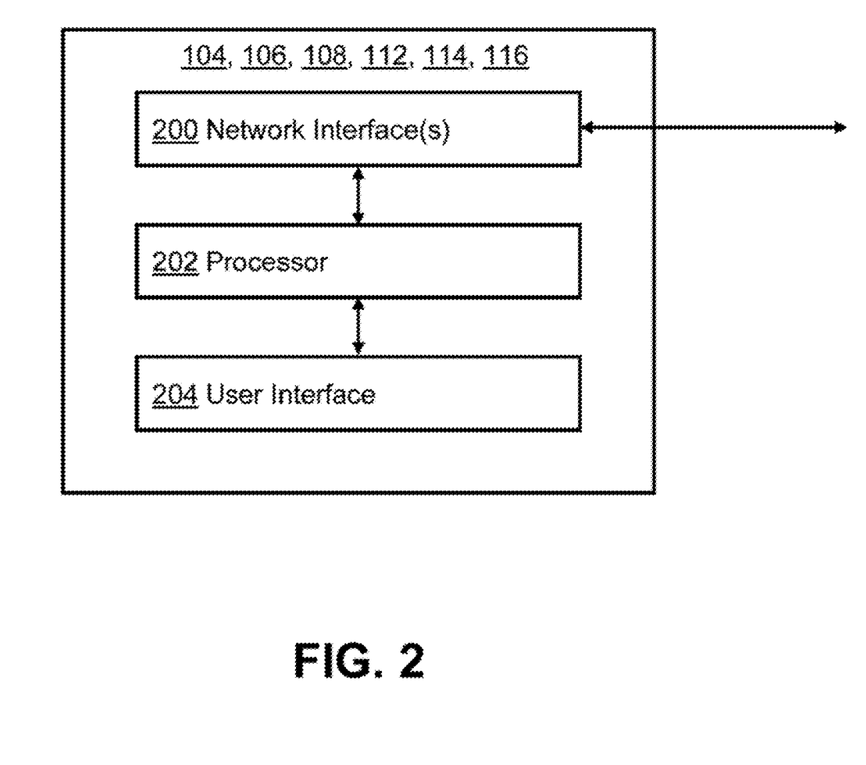
FIG. 2 is a generalized schematic of some of the devices shown in FIG. 1.

FIG. 2 shows the major components of a representative server 104, 106 or end-user device 108, 112, 114, 116. Network interfaces 200 send and receive media presentations, related information, and download requests. A processor 202 controls the operations of the device and, in particular, supports aspects of the present invention as illustrated in FIGS. 3 through 6, discussed below. The user interface 204 supports a user's (or administrator's) interactions with the device. Specific uses of these components by specific devices are discussed as appropriate below.

FIG. 3 presents a method for a Class A end-user device to set and use the user-interaction parameter. In step 300 of FIG. 3a, the end-user device 108 collects information about the amount of attention that the user is currently giving to this device 108. Some of this information can be generated by the device 108 itself. If, for example, the device 108 detects a significant amount of interaction with its user interface 204 (e.g., a number of keystrokes entered during the past minute), then the user is paying significant attention to the device 108. Historical information or a user profile can also be useful here. In some embodiments, the user can explicitly set an attention parameter, e.g., by moving a software "slider" presented by the user interface 204: The slider gives the user's estimation of how much attention he is paying to each of two (or more) user devices.

The slider can, in fact, be used to override the other information gathered about the user's current attention profile. That is, with the slider the user can direct the end-user device 108 to act as if he is splitting his attention in a given way, regardless of whether he is actually doing so. (This same overriding effect can be achieved by the user setting preferences or a policy.) Reasons why a user would like to do this are discussed below in relation to step 306 where the user-interaction parameter is used.

In step 300, the device 108 may also receive information from "off the device" 108 itself. If, for example, the set-top box 112 notes that the user is actively interacting with an electronic program guide presented on the television monitor 114, the set-top box 112 can send this information to the device 108. A camera on any of the end-user devices 108, 112, 114, 116 may see the user's eyes and note where he is looking. Even when no such direct information is available, indirect information can help. For example, the set-top box 112 reports that, responding to a previous command from the user, it is rendering a movie on the television monitor 114. Online ratings show that the current scene is considered by many people to be very exciting. When this information is made available to the end-user device 108, that device 108 may conclude, in the absence of any countervailing information, that the user's attention is probably focused on the monitor 114. In sum, any information that can be used to determine, or even speculate about, the user's attention profile can be used in step 300.

The end-user device 108 gathers in step 302 information about the amount of attention the user is paying to a device (or devices) other than the end-user device 108. Again, any type of information that is obtainable and that may be useful is pertinent here. Even "negative" information may have a place. If, for example, the device 108 has not received any information recently that the user is focusing any attention on it, then it might assume that the user is focusing his attention on the television monitor 114. Of course, negative information is usually very weak, as the user might not be paying any attention to any of the end-user device 108, 112, 114, 116. In many situations, the end-user device 108 when applying the method of FIG. 3 does the best it can with limited information.

Based on all of the information it has been able to gather in steps 300 and 302, the end-user device 108 sets the user-interaction parameter in step 304. In the simplest scenario with only two devices 108, 114, the end-user device 108 may, if the gathered information does not contradict this, assume that the user's entire attention is divided between these two devices 108, 114. As mentioned above, this simple assumption can be incorrect as when the user is not paying much attention to any of the end-user devices 108, 112, 114, 116. That is, the user may be giving much or all of his attention to an "uninstrumented" Class C device, but there is not enough information for the end-user device 108 to determine that this is the case.

With more information or more devices, the end-user device 108 can create a multi-dimensional user-interaction parameter that represents how the user's attention is spread to multiple devices. The quality of the user-interaction parameter is based on the quality and amount of information gathered and especially on the number of end-user devices 108, 112, 114, 116 that contribute some information.

After doing the best job it can in setting the user-interaction parameter in step 304, the end-user device 108 uses that parameter in step 306 to configure its user interface 204 in some manner thought to be appropriate for the amount of attention that the user is currently giving to the device 108. Many variations are possible here, and a few examples serve to illustrate a range of possibilities.

Consider first the situation where, as far as the end-user device 108 can determine, the entirety of the user's attention is divided between the television monitor 114 and the smart phone 108. The user-interaction parameter can then be a one-dimensional quantity, even, in the simplest case, a one-bit quantity that says whether the bulk of the user's attention is on the monitor 114 or the phone 108. If the user is primarily focused on the monitor 114, then this is the classic "lean-back" scenario. That is, the user is "leaning back" into his couch and watching television. In this case, the user interface 204 of the phone 108 can be made very simple so as not to distract the user. The user interface 204 of the phone 108 is configured to emphasize inputs that the user can comfortably use without taking his primary attention away from the monitor 114. These inputs can include a motion sensor (for shaking or gestural input), a microphone for speech input, and a camera that watches for other user inputs. Keyboard and mouse input (which require some degree of concentration) are de-emphasized or turned off entirely. Outputs for the phone 108 are also configured so as not to needlessly distract the user. Small icons on the screen of the phone 108 will probably not be noticed at all, so non-urgent displays or messages can be simply discarded or stored for later review. Modalities of the user interface 204 can be also be altered: If, for example, a tornado-warning message comes in, requiring the user's immediate action, then rather than displaying a static icon on the screen of the phone 108, the user's attention can be "grabbed" by displaying a large, pulsating icon or by playing an alert through the speaker of the phone 108. (This is an example of optional step 308.)

Consider next the same physical layout as above, but where the smart phone 108 determines that the user's primary attention is given to it with only secondary attention given to the television monitor 114. This is called "lean-forward," and, because the user is actively watching the screen of the phone 108, a much richer interface is appropriate. Smaller icons, and more of them, can be displayed with the expectation that the user will notice them. The keyboard and mouse interfaces, which allow finer control than gestures, are emphasized.

If the smart phone 108 can estimate how the user's attention is split between the television monitor 114 and the phone 108, then it can configure its interface 204 somewhere between the extremes of "lean-back" and "lean-forward." Similarly, if the phone 108 is aware (or suspects) that the user's attention is split among more than the two devices 108, 114, it can accordingly present an appropriate user interface 204.

In the discussion of step 300 above, it was noted that the user can set a "slider" (or otherwise interact with the user interface 204 of the end-user device 108) to force a particular value for the user-interaction parameter. This option is especially useful when, through lack of information, the procedure of FIG. 3 calculates a user-interaction parameter that does not reflect the user's actual attention profile. The user may also wish to "lock down" the parameter if he is constantly changing the focus of his attention and would rather adapt himself to the devices 108, 112, 114, 116 rather than having the devices 108, 112, 114, 116 attempt to adapt themselves to him. While this explicit setting essentially nullifies (or makes trivially easy) the operations of step 304, aspects of the present invention, including especially the user-interface configuration of step 306, are still applicable and useful.

Note that the above examples only discuss how the interface 204 of the end-user device 108 (a Class A device) is configured. Configuration of other (non-Class A) devices are discussed below.

The end-user device 108 can apply the user-interaction parameter for purposes other than configuring its user interface 204. As another example of step 308, when media content is received, the device 108 can analyze the urgency of the content and then, based on the user-interaction parameter, direct the content to the most appropriate end-user device 108, 112, 114, 116. Returning to the example of the tornado warning, the warning can be sent to whichever device 108, 112, 114, 116 is currently receiving the bulk of the user's attention, or even to all possible devices 108, 112, 114, 116 so that the user becomes aware of the warning as quickly as possible. Other uses of the user-interaction parameter, such as re-mapping the meaning of gestural inputs, are also contemplated.

The user-interaction parameter can be used in selecting a particular media presentation to render or an application to run in optional step 310. If, for example, the user is primarily focusing on a football game displayed on the television monitor 114, then content relating to that game (e.g., advertisements, players' biographies, a commentary track) could be displayed on the end-user device 108.

FIG. 3b presents other optional uses of the user-interaction parameter. Because current applications are not written to consider how to use the user-interaction parameter, the above step 306 would generally be performed by the operating system of the end-user device 108. It is expected that in the future at least some applications would be able to accept the user-interaction parameter in step 312 and to configure their operations accordingly.

In step 314, the end-user device 108, after having calculated the user-interaction parameter, sends that parameter to another device. The other device would probably be a Class B end-user device (discussed below in relation to FIG. 4) or a Class Y server (FIG. 5). In some situations, the device 108 does not send the actual user-interaction parameter in step 314 but instead sends a value based on that parameter. For example, the device 108 can review the information contained in the user-interaction parameter and send a value tailored to a Class B end-user device.

In addition to sending the user-interaction parameter to a server in step 314, the end-user device 108 could send further information in step 316. Generally, this further information allows the recipient server to better understand the user's current attention profile. Specific examples are discussed below in reference to step 502 of FIG. 5 and step 604 of FIG. 6 where the server receives and applies the further information.

In step 318, a server sends a command to the end-user device 108, and the device 108 responds. This step is relevant because the command may be based on the user-interaction parameter (sent to the server in step 314), and the specific response by the device 108 may also be based on the user-interaction parameter.

Note that in an actual scenario, the steps of FIG. 3 are performed repeatedly and possibly in an overlapping fashion. The user's attention profile is constantly monitored, and, as changes are noted, those changes are reflected in a change to the user-interaction parameter which could result in changes to user interfaces 204 and applications. For example, the end-user device 108 may note that the user has just changed from a lean-back mode to a lean-forward mode. In addition to configuring the user interface 204 of the device 108 to optimize the user's interaction in the lean-forward mode, the device 108 can take specific actions based on the change in modes. The device 108 may, for example, recommend that the media playing on the television monitor 114 (to which the user is now paying less attention) be paused or recorded for future playback. The particular lean-back configuration settings can be stored so that they can be re-instituted if the user goes back to focusing his attention on the monitor 114.

Figure 4:
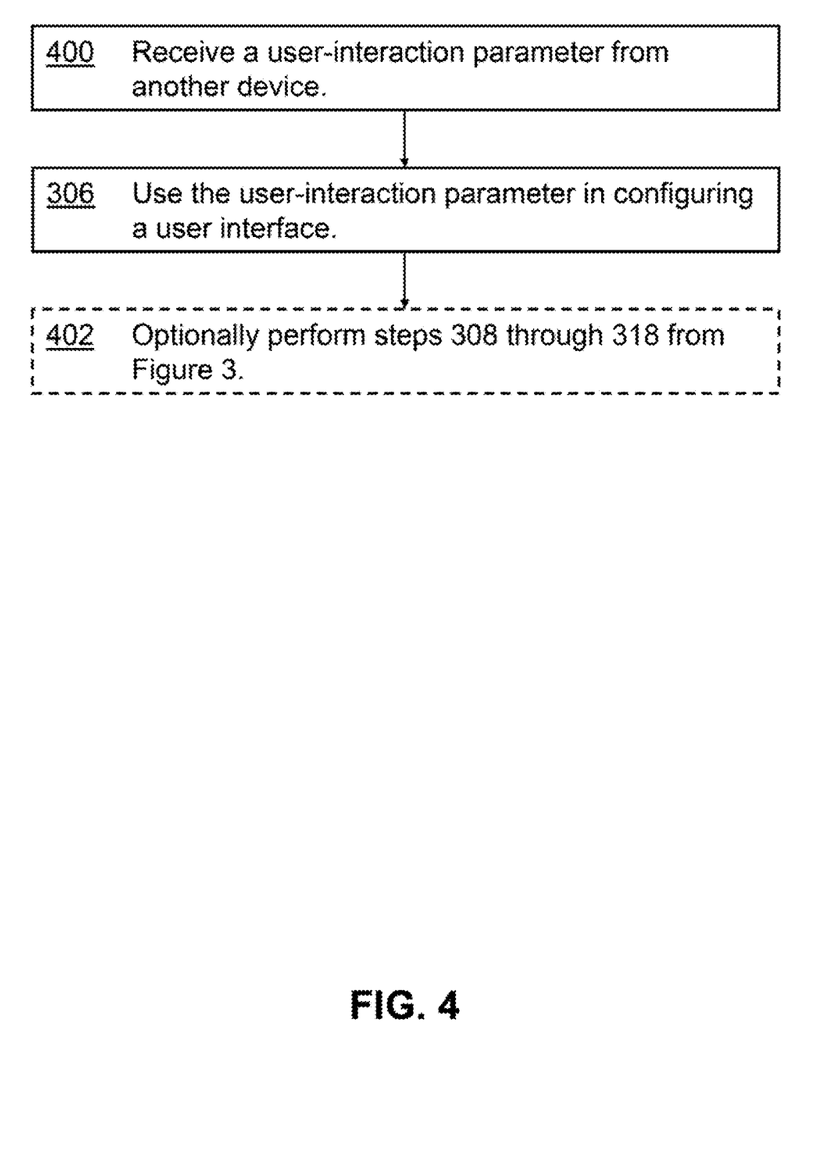
FIG. 4 is a flowchart of a representative method for an end-user device that responds to a user-interaction parameter sent to it.

FIG. 4 presents a method of operation applicable to a Class B device. If the set-top box 112 is such a device, then it would receive, in step 400, the user-interaction parameter (or a value based on that parameter) from another device, possibly from the Class A end-user device 108 that set the parameter (or from a server: see the discussion of FIGS. 5 and 6, below). The value received could be tailored for the particular recipient device 112. For example, rather than telling the device 112 the entire profile of the user's attention, the value could simply say that the user is giving, say, 30% of his attention to the device 112.

With the parameter in hand, the device 112 configures its user interface 204 in step 306. This step uses the same numbering as the equivalent step in the procedure of the Class A device 108 (FIG. 3a), because the present Class B device 112 applies the same considerations when setting its user interface 204. To emphasize that point, the Class B device 112 can then, in step 402, perform any or all of the optional steps 308 through 318 of FIGS. 3a and 3b.

In sum, the Class B device 112 of FIG. 4 may be able to do everything that the Class A device 108 of FIG. 3 does with the exception of actually deriving the user-interaction parameter. Of course, different devices are built with different limitations, so that not all Class B devices 112 (and not all Class A devices 108, for that matter) can perform all of the optional steps 308 through 318.

Note also that, in general, this Class B device 112 gathers whatever information it can that is relevant to the user's attention profile and sends that information to the Class A device 108. This information can include explicit user settings, profile information, historical and current user-interaction patterns, and user preferences and policies. This is discussed above in relation to step 302 of FIG. 3a. The Class A device 108 uses this information when setting the user-interaction parameter in step 304 of FIG. 3a.

A Class Y server 104 can operate according to the exemplary method of FIG. 5. In step 500, the server 104 receives the user-interaction parameter (or a value based on it), probably from the Class A end-user device 108 that calculated the parameter (or from a Class Z server: see FIG. 6 and accompanying discussion). In some situations, more than one end-user device 108, 112, 114, 116 is a Class A device, and in that case the server 104 can receive multiple user-interaction parameters in step 500.

The server 104 can also receive other relevant information in step 502 such as an identification of the device sending the user-interaction parameter, contextual information, and information about how the sending device responded to the user-interaction parameter. (See the discussion of step 316 of FIG. 3b.)

Based on the information received in steps 500 and 502, the server 104 sends a message to an end-user device 108, 112, 114, 116 in step 504. For example, the message can give a Class B device 112 enough information so that the device 112 can configure its user interface 204. For a Class C end-user device, the message can be more explicit, telling the device exactly how to configure its user interface 204. (Class C devices, remember, do not know how to respond to the user-interaction parameter, but their user interface 204 may still be appropriately configurable.) That is, a Class B device 112 can be told that the user is in lean-back mode, and the Class B device 112 then configures its user interface 204 accordingly. The Class C device, on the other hand, is given explicit instructions that configure its user interface 204 to accommodate the user's lean-back. Different Class B and C devices have different limitations, but in the most general case, they can be configured in as many ways as a Class A device 108 configures itself. (See the discussion of step 306 of FIG. 3a.)

The server 104 can send messages other than configuration messages in step 504. The server 104 may select media content or an application based on the information it received in steps 500 and 502 and send it out in step 504.

Finally, FIG. 6 presents a method for a Class Z server 106. The method begins with steps 600 and 602 where the server 106 receives attention information from multiple user devices 108, 112, 114, 116. This is the same kind of information that the Class A device 108 receives in step 302 of FIG. 3a. In step 604, the server 106 can also receive further information from an end-user device 108, 112, 114, 116, such as the information described above in relation to step 502 of FIG. 5.

Then in step 606, the server 106 sets a user-interaction parameter based on all of the information available to it.

Here, the server 106 can use much of the procedure that the Class A device 108 uses in step 304 of FIG. 3a.

Now that the user-interaction parameter has been set, the server 106 proceeds, in step 608, to communicate with one or more of the end-user devices 108, 112, 114, 116 just as the Class Y server 104 did in step 504 of FIG. 5 (discussed above).

The above discussion clearly separates devices into the A, B, C, Y, and Z Classes. It is important to remember that while a device operates in one class in one situation, in another situation the same device may operate in another class. Also, any information available from any device may, in theory, become useful as input in setting the user-interaction parameter.

In view of the many possible embodiments to which the principles of the present invention may be applied, it should be recognized that the embodiments described herein with respect to the drawing figures are meant to be illustrative only and should not be taken as limiting the scope of the invention. For example, multiple devices of various classes can all work together to set the user-interaction parameter and to respond to that parameter once set. Therefore, the invention as described herein contemplates all such embodiments as may come within the scope of the following claims and equivalents thereof.

We claim:

1. In a communications environment where a user has access to both a first media-consumption device and to a second media-consumption device, the two devices distinct, a method for a server, distinct from the first and second devices, to support multiple user-interaction modes, the method comprising:
  receiving, by the server from the first device, a user-interaction parameter; and
  sending, by the server to a recipient device, a message, the message based, at least in part, on the received user-interaction parameter;
  wherein the recipient device is selected from the group consisting of: the first device and the second device;
  wherein the message directs the recipient device to configure a user interface on the recipient device, the configuring based, at least in part, on the user-interaction parameter;
  wherein when the user-interaction parameter is set to a lean-forward mode, configuring the user interface comprises enabling a keyboard input and a display output; and
  wherein when the user-interaction parameter is set to a lean-back mode, configuring the user interface comprises enabling a sensor input, wherein the sensor is selected from the group consisting of: a touch sensor, a microphone, a motion sensor, a camera, and a position sensor.

2. The method of claim 1 wherein the first and second devices are selected from the group consisting of: a set-top box, a television, a mobile telephone, a personal digital assistant, a personal computer, an electronic picture frame, a tablet computer, and a gaming console.

3. The method of claim 1 wherein the server is selected from the group consisting of: a computer and a plurality of computers.

4. The method of claim 1 wherein configuring the user interface comprises setting a display modality of the user interface.

5. The method of claim 1 further comprising:
  selecting, by the server, media content;
  wherein the message comprises the selected media content; and
  wherein the selecting is based, at least in part, on the received user-interaction parameter.

6. The method of claim 1 further comprising:
  selecting, by the server, an activity;
  wherein the message comprises a command to perform the selected activity; and
  wherein the selecting is based, at least in part, on the received user-interaction parameter.

7. The method of claim 1 further comprising:
  receiving, by the server from the first device, further information;
  wherein the message is further based, at least in part, on the received further information; and
  wherein the further information is selected from the group consisting of: interaction-context information, device information, information about a user-interface configuration set by the first device, and information about a selection made by the first device based, at least in part, on the user-interaction parameter.

8. A server configured for supporting multiple user-interaction modes in a communications environment where a user has access to both a first media-consumption device and to a second media-consumption device, the two devices and the server all distinct, the server comprising:
  a transceiver configured for receiving, from the first device, a user-interaction parameter; and
  a processor operatively connected to the transceiver and configured for:
    sending, via the transceiver to a recipient device, a message, the message based, at least in part, on the received user-interaction parameter;
    wherein the recipient device is selected from the group consisting of: the first device and the second device;
    wherein the message directs the recipient device to configure a user interface on the recipient device, the configuring based, at least in part, on the user-interaction parameter;
    wherein when the user-interaction parameter is set to a lean-forward mode, configuring the user interface comprises enabling a keyboard input and a display output; and
    wherein when the user-interaction parameter is set to a lean-back mode, configuring the user interface comprises enabling a sensor input, wherein the sensor is selected from the group consisting of: a touch sensor, a microphone, a motion sensor, a camera, and a position sensor.

9. The server of claim 8 wherein the server is selected from the group consisting of: a computer and a plurality of computers.

10. In a communications environment where a user has access to both a first media-consumption device and to a second media-consumption device, the two devices distinct, a method for a server, distinct from the first and second devices, to support multiple user-interaction modes, the method comprising:
  receiving, by the server from the first device, first information associated with an amount of attention paid to the first device;
  receiving, by the server from the second device, second information associated with an amount of attention paid to the second device;

based, at least in part, on the received first and second attention information, setting a user-interaction parameter for a recipient device; and sending, by the server to the recipient device, a message, the message based, at least in part, on the user-interaction parameter;

wherein the recipient device is selected from the group consisting of: the first device and the second device;

wherein the message directs the recipient device to configure a user interface on the recipient device, the configuring based, at least in part, on the user-interaction parameter;

wherein when the user-interaction parameter is set to a lean-forward mode, configuring the user interface comprises enabling a keyboard input and a display output; and wherein when the user-interaction parameter is set to a lean-back mode, configuring the user interface comprises enabling a sensor input, wherein the sensor is selected from the group consisting of: a touch sensor, a microphone, a motion sensor, a camera, and a position sensor.

11. The method of claim 10 wherein the first and second devices are selected from the group consisting of: a set-top box, a television, a mobile telephone, a personal digital assistant, a personal computer, an electronic picture frame, a tablet computer, and a gaming console.

12. The method of claim 10 wherein the server is selected from the group consisting of: a computer and a plurality of computers.

13. The method of claim 10 wherein configuring the user interface comprises setting a display modality of the user interface.

14. The method of claim 10 further comprising:
selecting, by the server, media content;
wherein the message comprises the selected media content; and
wherein the selecting is based, at least in part, on the user-interaction parameter.

15. The method of claim 10 further comprising:
selecting, by the server, an activity;
wherein the message comprises a command to perform the selected activity; and
wherein the selecting is based, at least in part, on the user-interaction parameter.

16. The method of claim 10 further comprising:
receiving, by the server from the first device, further information;
wherein the message is further based, at least in part, on the received further information; and
wherein the further information is selected from the group consisting of: interaction-context information, device information, information about a user-interface configuration set by the first device, and information about a selection made by the first device based, at least in part, on the user-interaction parameter.

17. A server configured for supporting multiple user-interaction modes in a communications environment where a user has access to both a first media-consumption device and to a second media-consumption device, the two devices and the server all distinct, the server comprising:

a transceiver configured for receiving, from the first device, first information associated with an amount of attention paid to the first device and for receiving, from the second device, second information associated with an amount of attention paid to the second device; and a processor operatively connected to the transceiver and configured for:
based, at least in part, on the received first and second attention information, setting a user-interaction parameter for a recipient device; and sending, via the transceiver to the recipient device, a message, the message based, at least in part, on the user-interaction parameter;

wherein the recipient device is selected from the group consisting of: the first device and the second device;

wherein the message directs the recipient device to configure a user interface on the recipient device, the configuring based, at least in part, on the user-interaction parameter;

wherein when the user-interaction parameter is set to a lean-forward mode, configuring the user interface comprises enabling a keyboard input and a display output; and wherein when the user-interaction parameter is set to a lean-back mode, configuring the user interface comprises enabling a sensor input, wherein the sensor is selected from the group consisting of: a touch sensor, a microphone, a motion sensor, a camera, and a position sensor.

18. The server of claim 17 wherein the server is selected from the group consisting of: a computer and a plurality of computers.

* * * * *